Feb. 27, 1962

J. D. FOULKES 3,023,309

COMMUNICATION SYSTEM

Filed Dec. 19, 1960

INVENTOR
J. D. FOULKES
BY
[signature]
ATTORNEY

United States Patent Office 3,023,309

Patented Feb. 27, 1962

3,023,309

COMMUNICATION SYSTEM

John D. Foulkes, Mountain Lakes, N.J., assignor to Bell Telephone Laboratories, Incorporated, New York, N.Y., a corporation of New York Filed Dec. 19, 1960, Ser. No. 76,830

9 Claims. (Cl. 250—17)

Figure 1:
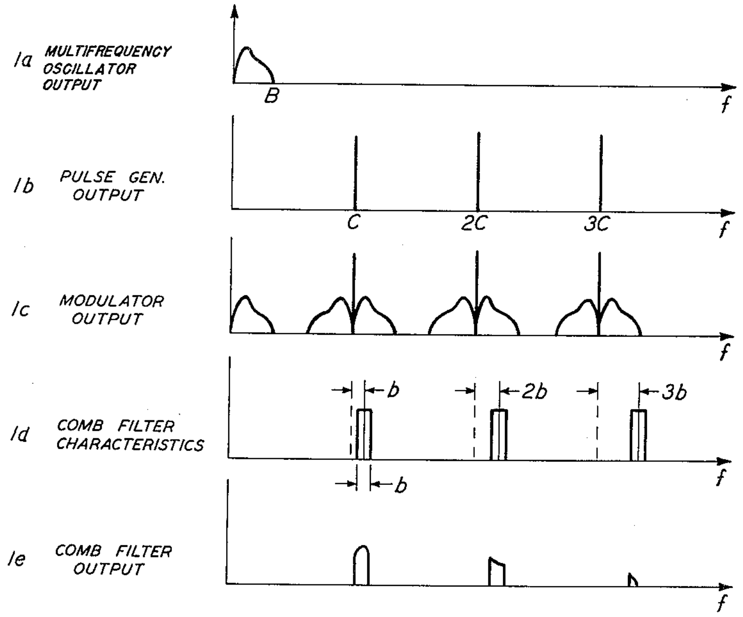

This invention relates to radio transmission systems. More particularly, it relates to the reliable transmission of communication signals within frequency ranges severely affected by fading.

In the high-frequency range during fading conditions, radio signals on different frequencies may exhibit at the same instant radically different behavior. This is true even though they are in the same frequency band and exhibit the same statistical behavior when observed over a longer period of time. The variations in the strength of received radio signals, known as "fading," are caused by variable or temporary conditions in the transmission path. Multipath transmission is believed to be the principal source of this frequency selective fading.

Multipath transmission involves the reception of a plurality of signal rays for each signal, each of which travels over a different path between the transmitter and receiver. Generally, each path has a different length between the transmitter and receiver. Multipath transmission includes either or both reflection or refraction of at least one (or in some cases, all) of the received rays. Because the conditions of the atmosphere, or the environment of the receiver, are continuously varying, the paths of the received rays are also continuously varying with time. The received signal is the resultant of all the rays accepted by a receiving antenna. If the rays arrive in nearly the same phase they add and enhance the received signal; if they arrive in phase opposition they partially cancel each other and fading results. This fading is thus not only variable with respect to time but also with respect to signal frequency.

An object of the present invention is the transmission of signals at radio frequencies without losing intelligibility due to fading.

Several techniques have been developed for alleviating the effect of frequency selective fading. The more prominent of these techniques include space and frequency diversity signaling. Space diversity may be achieved by strategic geographical placement of either a pair of transmitters, a pair of receivers, or both, in order to yield two distinct paths over which communication may be maintained. Frequency diversity signaling, which involves the use of several distinct carrier frequencies to transmit information, may be achieved by numerous methods. In one method the same signal is transmitted simultaneously at different frequencies. Thus, if one carrier frequency is subjected to undue fading, the possibility of others being unaffected is high, and the signal may be extracted from other carriers. In another method, a sample signal embracing the entire communication channel is transmitted and examined in order to control compensation of the receiving amplifiers for existing fades. Still another method involves the division of an intelligence signal into components and the transmission of each component at a different frequency.

A great advantage instantly evident in connection with the last-mentioned frequency diversity signaling technique is that only a single signal need be transmitted and only one transmitting and receiving point is required. Several arrangements have been developed for implementing this signaling technique. In one such arrangement, an intelligence signal is divided into small bands. Alternate bands are then combined and the two resulting combined signals are individually transmitted by either space or frequency diversity. Another arrangement involves dividing the intelligence signal into two parts and then modulating each part with a carrier frequency in a different part of the transmission channel. It will be understood that neither of these methods effectively distributes a signal over an entire transmission channel. In the case of the first arrangement each band retains essentially its same position in the frequency spectrum with respect to substantially adjacent bands. Conceivably, the second arrangement could be made more effective by dividing the signal into more component parts and transmitting each part at a different carrier frequency. However, such an arrangement would entail a great increase in transmitting equipment.

Another object of the invention is to provide a reliable and efficient system wherein intelligence signals are separated into discrete frequency bands and each band is transmitted separately in a different portion of a transmission channel.

Generally, the invention is directed to a transmission system wherein a baseband intelligence signal is used to modulate a fundamental frequency and its harmonics thereby creating sidebands representative of the baseband signal at the fundamental and each harmonic frequency. The resulting signal is passed through a comb filter which extracts a different discrete portion of the sideband occurring at each harmonic frequency. The extracted portions are then modulated by a single carrier frequency for transmission.

Several definitions will render the following material more explicit. Hereinafter, "intelligence signal" will be understood to mean a signal or plurality of signals comprising the information to be transmitted. These signals are disposed within a predetermined bandwidth. "Transmission channel" will be understood to mean a high-frequency radio channel over which modulated signals are radiated. The bandwidth of this channel exceeds the bandwidth of said intelligence signal.

The invention is disclosed as embodied in a system for the transmission of audio signals over a radio channel. The great advantages to be gained by a transmission system such as that herein described will be better understood following a brief examination of human response to audio signals and, particularly, to speech signals.

The transmission characteristics of the normal environment for speech systems—that is, rooms, halls, and large spaces—show variations of up to 40 db within the audio range. Nevertheless, speech is highly intelligible when transmitted through this medium in everyday life. The explanation for this intelligibility apparently lies in the fact that the absence of particular frequency components is not critical to the total understanding of any group of signals. In view of this, if such an audio signal is first elevated by modulation on a radio frequency and subsequently demodulated at a receiving point, the absence of individual frequency components will not destroy intelligibility. By acquiring sufficient dispersion throughout a transmission channel selective frequency fading will affect individual frequency components of the modulating signal only, in much the same way room acoustics affect the normal audio band. Adequate dispersion, however, requires a minimum spacing between each component of the audio signal and also a sufficient number of these components.

A feature of the invention resides in the use of a fundamental frequency and its harmonics to modulate an intelligence signal and thereby disperse it throughout a portion of the frequency spectrum.

Another feature of the invention relates to means for extracting different portions of a signal dispersed as above described for subsequent modulation and transmission by a single carrier frequency.

Figure 2:
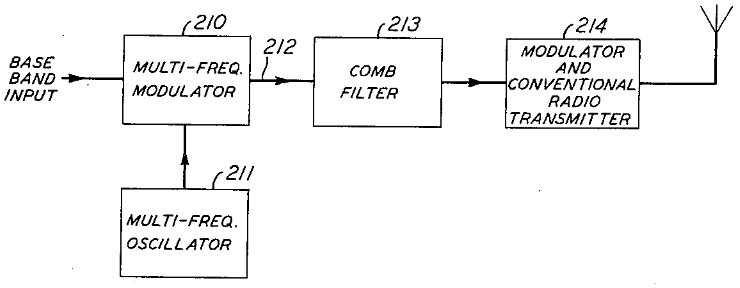
Figure 3:
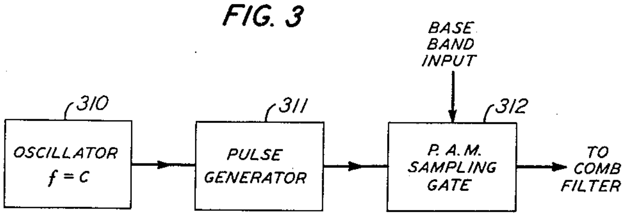

The above, as well as additional, objects and features will be more clearly understood and appreciated following a consideration of the drawings wherein:

FIG. 1 comprises a plurality of waveforms representative of the signal at various points in an embodiment of the present invention;

FIG. 2 is a block diagram schematic of the basic components of which an illustrative embodiment is composed; and FIG. 3 is a block diagram schematic of one arrangement for developing signals such as here contemplated.

FIG. 2 will be seen to comprise four blocks having an input signal on the left end. These four blocks represent the basic components required to implement the modulation technique of the invention. In operation, a baseband signal is applied to multifrequency modulator 210. This signal has been depicted in FIG. 1*a* wherein it is plotted as amplitude versus frequency. The signal depicted has a maximum frequency or bandwidth of B.

Multifrequency modulator 210 has an additional input from multifrequency oscillator 211, the nature of the input being illustrated in FIG. 1*b*. It will be recognized that FIG. 1*b* illustrates a signal of fundamental frequency C and succeeding harmonics thereof. Multifrequency modulator 210 is operative to modulate both incoming signals in the conventional fashion of a product modulator and produce an output at point 212, having the spectrum illustrated in FIG. 1*c*. The spectrum of FIG. 1*c* approximates that which would occur if the input from multifrequency oscillator 211 were considered a plurality of subcarriers. In effect, FIG. 1*c* illustrates a plurality of double sideband modulated carrier frequencies. It is this signal that is applied to comb filter 213.

The characteristics of the comb filter are depicted in FIG. 1*d* wherein the "teeth" represent pass bands of width *b*, centered at frequencies which are multiples of the frequency $C+b$. Obviously, the application of signals such as those depicted in FIG. 1*c* to a comb filter with the above-described characteristics will result in the extraction of a different discrete portion from each sideband appearing at each harmonic of the multifrequency oscillator output. Signals of this nature are depicted in FIG. 1*e*.

The baseband signal has been dispersed throughout a portion of the frequency spectrum. The extent of this portion of the spectrum is determined by frequency C and width *b* of each "tooth" of the comb filter. Although the illustration shows only three teeth, obviously the number of teeth would be determined by the equipment available and frequency dispersion desired. Once the baseband signal has been so dispersed a conventional radio transmitter 214 is employed to modulate the signal on a carrier within the transmission channel.

In further explanation of multifrequency oscillator 211 and multifrequency modulator 210, one arrangement for developing such elements is illustrated in FIG. 3. In FIG. 3, oscillator 310 produces essentially sinusoidal signals of frequency equal to C. These signals are employed to control pulse generator 311 which in response thereto generates a plurality of pulses having a frequency equal to C. By way of example, pulse generator 311 may comprise multivibrator circuits driving a blocking oscillator. It is well known that a pulse train of frequency C may be broken down by Fourier analysis into a plurality of sinusoidal frequencies consisting of fundamental frequency C and the harmonics thereof. Such pulses therefore are essentially comprised of the waveform depicted in FIG. 1*b*. These pulses are applied to a conventional pulse amplitude modulating sampling gate 312 in conjunction with the baseband signal. The output of sampling gate 312 will have the spectrum depicted in FIG. 1*c* and may be applied to a comb filter as previously described.

A plurality of techniques exist for the fabrication of a comb filter having the characteristics hereinbefore set forth. Among these are sampled data techniques, amplifiers and delay lines, and the interconnection of separate filters for each desired tooth. The use of the sampled data technique is developed in the article "An Alternative Approach to the Realization of Network Transfer Functions: The N-Path Filter," L. E. Franks and I. W. Sandburg, Bell System Technical Journal, vol. 39, September 1960, 1321. An embodiment of amplifiers and delay lines for the fabrication of a comb filter is explained in the paper "Analysis and Synthesis of Delay Line Periodic Filters," H. Urkowitz, I.R.E., P.G.C.T., June 1957, 41.

In recapitulation, it will be recalled that the characteristics of the comb filter required to practice the instant invention, assuming a baseband B, would be a plurality of pass bands of width *b* spaced at frequency intervals $C+b$. The number of required pass bands to cover an entire baseband being $B/b$. In the above relations, C is at least twice B, and *b* is less than B.

It should, of course, be appreciated that variations from these specifications are possible. For example, if the interval between teeth were slightly more than $C+b$ small portions of the baseband would be deleted, permitting a compression of this signal for transmission. Furthermore, were it desired to use something other than double sideband modulation, frequency C might be closer in value to that of bandwidth B.

The above-described system is merely an illustrative embodiment of the invention. Other techniques may be employed by those skilled in the art without departing from the spirit or teachings herein.

What is claimed is:

1. A system for transmitting signals of a particular bandwidth comprising a modulator for modulating said signals with a fundamental frequency and a plurality of harmonics thereof, a comb filter connected to said modulator and having a plurality of pass bands of width equal to a fraction of said particular bandwidth spaced at frequency intervals equal to said fundamental frequency plus the width of one of the pass bands of said filter, and means connected to said comb filter for modulating a carrier frequency with the output thereof.

2. In a system for transmitting intelligence signals of a particular bandwidth, a generator producing signals having a fundamental frequency greater than said particular bandwidth and the harmonics of said fundamental frequency, means for modulating said fundamental and harmonic signals with said intelligence signals, a comb filter connected to the output of said modulating means and having pass bands that are a preselected portion of said particular bandwidth spaced at frequency intervals equal to said fundamental frequency plus said preselected portion, and means connected to said comb filter for modulating the output thereof with a single frequency for transmission.

3. A system as defined in claim 2 wherein said fundamental frequency is at least twice said particular bandwidth.

4. In a system for transmitting intelligence signals of a particular bandwidth, a pulse generator producing pulses at a repetition frequency equal or greater than twice said particular bandwidth, modulating means for modulating said pulses with said intelligence signals producing sidebands representative of said intelligence signals at said repetition frequency and each harmonic thereof, a comb filter connected to the output of said modulating means and having a plurality of pass bands that are a portion of said particular bandwidth spaced at frequency intervals equal to said repetition frequency plus said portion, and means connected to said comb filter for transmitting the output thereof over a transmission channel.

5. A circuit for transmitting audio signals comprising an oscillator yielding an output signal having a frequency outside the audio band, a pulse generator controlled by said oscillator yielding pulses at said frequency, means for modulating said pulses with said audio signals, a comb filter connected to said modulating means having a plurality of pass bands for passing a fractional portion of the modulated audio signals, said pass bands being distributed over the frequency spectrum at frequency intervals equal to said oscillator frequency plus said fractional portion of said modulated audio signal, and means connected to said comb filter for modulating a carrier frequency with the output thereof.

6. A circuit as defined in claim 5 wherein said oscillator output signal has a frequency at least twice said audio band.

7. In a system for the transmission of signals occupying a frequency band, a harmonic signal generator producing a signal outside said frequency band and a plurality of harmonics thereof, modulation means connected to modulate said frequency band of signals with said produced signal and its harmonics, thereby producing sideband signals at each harmonic frequency, a comb filter connected to the output of said modulation means and selectively passing a different discrete portion of the sideband appearing at each harmonic frequency, and means connected to said comb filter for modulating a carrier frequency with the output thereof.

8. A transmission system for signals having a bandwidth of X cycles per second comprising a frequency generator supplying signals of frequency at least 2X cycles per second and harmonics thereof, means for modulating the signal outputs of said frequency generator with said X-bandwidth signal, a comb filter having N frequency pass bands of width $$\frac{X}{N}$$

cycles per second connected to the output of said modulating means, said pass bands being distributed over the frequency spectrum at frequency intervals of $$X+\frac{X}{N}$$

cycles per second, and means connected to the output of said comb filter for modulating each said discrete band with a carrier frequency.

9. In a system for the transmission of signals occupying a frequency band, a harmonic signal generator producing a signal outside said frequency band and a plurality of harmonics thereof, modulation means connected to modulate said frequency band of signals with said produced signal and its harmonics, thereby producing sideband signals at each harmonic frequency, a comb filter connected to the output of said modulation means and selectively passing a different discrete portion of the sideband appearing at each harmonic frequency, and means connected to said comb filter for transmitting the output thereof over a transmission channel.

References Cited in the file of this patent

UNITED STATES PATENTS 1,537,609 Hogan ---------------- May 12, 1925
1,766,047 Taylor ---------------- June 24, 1930